United States Patent
Lockhart et al.

(10) Patent No.: US 9,436,693 B1
(45) Date of Patent: Sep. 6, 2016

(54) DYNAMIC NETWORK ACCESS OF SNAPSHOTTED VERSIONS OF A CLUSTERED FILE SYSTEM

(71) Applicant: EMC CORPORATION, Hopkinton, MA (US)

(72) Inventors: Steven Lockhart, Seattle, WA (US); Jeffrey Hughes, Seattle, WA (US); Darrick Lew, Seattle, WA (US); Nathan Koppes, Bellevue, WA (US)

(73) Assignee: EMC Corporation, Hopkinton, MA (US)

(*) Notice: Subject to any disclaimer, the term of this patent is extended or adjusted under 35 U.S.C. 154(b) by 138 days.

(21) Appl. No.: 13/957,318

(22) Filed: Aug. 1, 2013

(51) Int. Cl.
  *G06F 7/00* (2006.01)
  *G06F 17/00* (2006.01)
  *G06F 17/30* (2006.01)
  *G06F 11/14* (2006.01)

(52) U.S. Cl.
  CPC ..... *G06F 17/30088* (2013.01); *G06F 11/1464* (2013.01)

(58) Field of Classification Search
  CPC .................. G06F 17/30132; G06F 17/30088; G06F 17/30194; G06F 11/1468
  USPC .......................... 707/634, 639, 652, 694, 770
  See application file for complete search history.

(56) References Cited

U.S. PATENT DOCUMENTS

| | | | |
|---|---|---|---|
| 8,341,363 B2 | 12/2012 | Chou et al. | |
| 2003/0182317 A1* | 9/2003 | Kahn et al. | 707/200 |
| 2004/0220971 A1* | 11/2004 | Kaushik et al. | 707/200 |
| 2011/0258461 A1 | 10/2011 | Bates | |
| 2012/0265836 A1* | 10/2012 | Nemoto et al. | 709/211 |

OTHER PUBLICATIONS

Official Communication received for U.S. Appl. No. 13/452,491 mailed Dec. 31, 2013.

* cited by examiner

*Primary Examiner* — Md I Uddin
(74) *Attorney, Agent, or Firm* — Sean M. Evans; Krishnendu Gupta

(57) ABSTRACT

The various embodiments are directed towards enabling access to snapshotted versions of files in a distributed file system. The distributed file system may receive a file system operation request that includes at least an entry-ID and a snapshot-ID. File system operation requests may include operations such as reads, writes, moves, or the like. Directory entries that match the entry-ID and the snapshot-ID may be looked up and retrieved from the distributed file system. The retrieved directory entries may also be arranged to include a generation-ID. In the directory entry matching the snapshot-ID, if the generation-ID and the snapshot-ID are different, another directory entry may be looked up from the distributed file system using the entry-ID and the generation-ID. Then the initially requested file system operation may be performed on the retrieved directory entry.

20 Claims, 9 Drawing Sheets

DYNAMIC NETWORK ACCESS OF SNAPSHOTTED VERSIONS OF A CLUSTERED FILE SYSTEM

TECHNICAL FIELD

Various embodiments relate generally to managing data snapshots in a file system, and more particularly to, managing the current view of a distributed file system for a client.

BACKGROUND

High performance computing often requires access to data and files stored on relatively slow non-volatile stable storage devices, such as hard drives. Overall computing performance may be improved by improving file access performance. Caches that use high-speed volatile storage placed close to the data write source may often improve high performance file and data access. Data caches may improve performance by reducing the time and overhead required for writes to complete. However, data caches that use volatile unstable storage may lose data if there are power outages or other failure events. Accordingly, data caches may be arranged to regularly flush data from volatile unstable storage to non-volatile stable storage.

Often, data caching must be suspended while flushing file data from high-speed unstable storage to slower stable storage. Otherwise, as data may be moved from unstable storage to stable storage new data may be written into the data cache at the same time data may be in the process of being moved to stable storage. This may make it difficult or impossible to avoid data and file system inconsistency.

Also, for computing systems with large and/or distributed data caching facilities it may take a relatively long time for file data caches to be flushed from unstable storage to stable storage. Suspending data caching for a long period of time may significantly impact the performance of computing systems. Likewise, in some distributed file systems enabling the archival of data that is stable and consistent may be difficult during file system operations. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
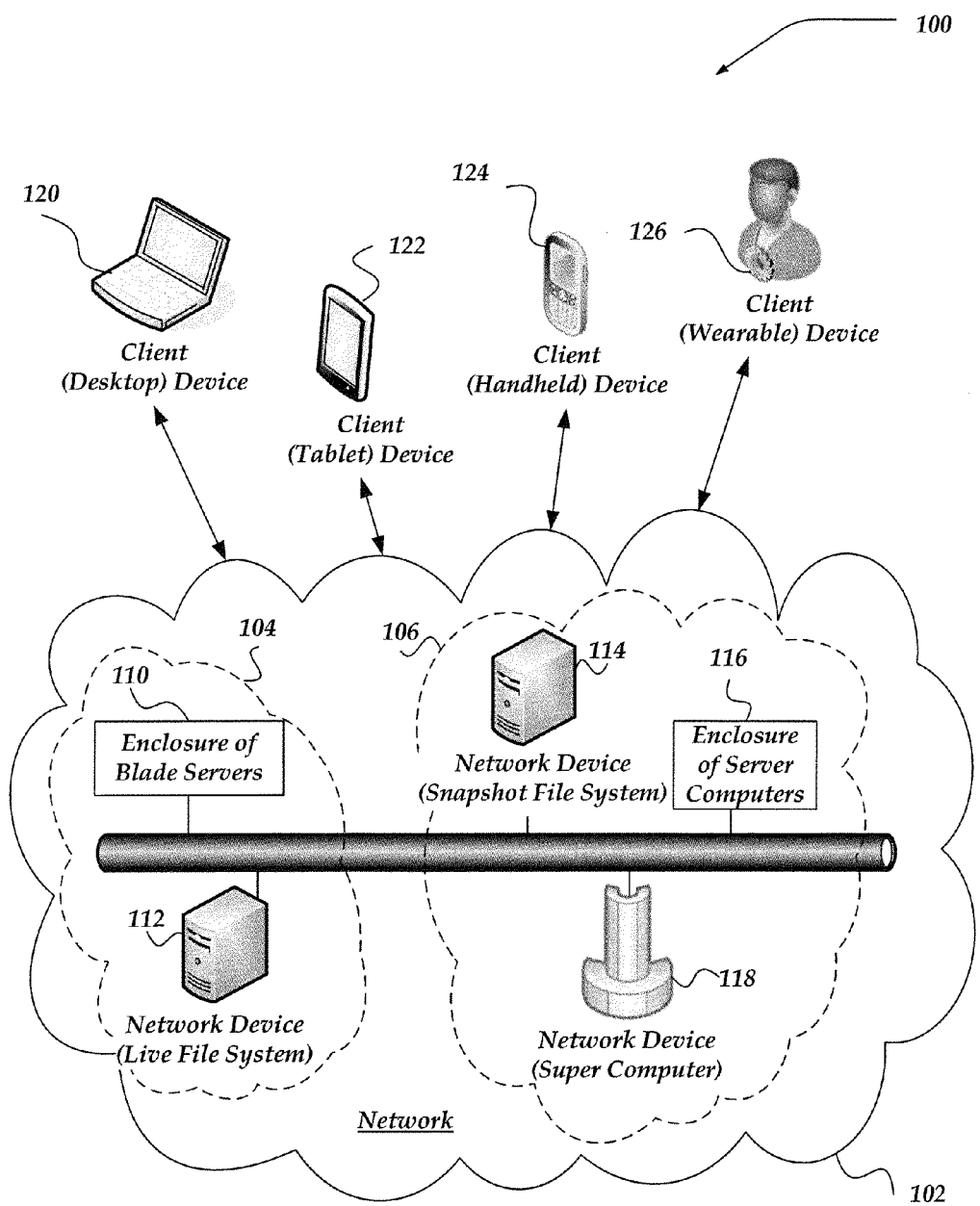
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

"Writer," or "writers" as used herein refer to threads, processes, applications, or the like, that may be writing data, or trying to write data, to a file on a file system. Likewise, "reader," or "readers," as used herein refer to threads, processes, applications, or the like, that may be reading, or trying to read data, from a file on a file system. Readers and/or writers may be part of the same process or application, as in the case of threads, or they may be in separate processes or applications. Further, they may be running on the same computing device or on one or more separate computing devices.

"Snapshot" as used herein refers to a read-only preserved version of files or other data in a file system. In at least one of the various embodiments, the content of a snapshot may be preserved at the time the snapshot was created. Thus, a process or application working with a snapshot may be assured that the data in the snapshot may exist and it may remain unchanged. However, this may apply if the data in question has been read at least once by any process on any node. Thus, if data associated with a snapshot is lost before it has been read, at least once, that data may not be considered part of the snapshot. In other words, in at least one of the various embodiments, data may not be ensured to be part of a snapshot until it has been read at least once. In at least one of the various embodiments, data assigned to snapshot may remain in unstable storage until a reader requests to the read the snapshot version of the data. At that time, if the data may be available it may be flushed to stable storage becoming a fully realize part of the snapshot version.

Also, snapshots may be useful in distributed file systems where many writers may be adding data to a file. Creating snapshots enables the files and data associated with the snapshot to be frozen at a particular time and may useful for a variety of reasons, such as, data analysis, point-in-time backups, data archival, or the like.

"Stable storage" as used herein refers to a classification of computer data storage technology and devices that may be resistant to some hardware, software, and power failures. In at least one of the various embodiments, storage devices for stable storage may often be block devices such as, magnetic platter hard disks, solid state hard drives, optical drives, or the like. Also, stable storage may be achieved using techniques such as, mirroring data on separate hard disks via RAID technology (level 1 or greater), replication of data on separate nodes and/or computing devices, or the like. In general, once data has reached stable storage clients and users may assume that the data may not be lost or corrupted.

"Unstable storage" as used herein refers to a classification of computer data storage technology and device that may not be resistant to some hardware, software, and power failures. Read and write access to unstable storage may often be very fast compared to stable storage. However, if there may be a power failure or application/system crash, data in affected unstable storage may often be lost and unrecoverable. In at least one of the various embodiments, unstable storage may be implemented using RAM, DRAM, SRAM, or the like, that may lose data if power is lost. In some references, unstable storage may be referred to as volatile storage or volatile memory. In general, users may not assume that data stored in unstable storage may not be lost or corrupted.

"Node" as used herein refers to virtual or physical computing devices, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

"Node cache" as used herein refers to unstable storage associated with a node in a cluster. In at least one of the various embodiments, each node may have a dedicated node cache that may store data blocks written by the node. Node caches may enable faster data writes because the data blocks may be stored in unstable storage that may be much faster to access than stable storage. In at least one of the various embodiments, if required the data blocks contained in the node cache may be flushed to stable storage.

"Inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems may implement inodes using a data structure explicitly named an inode. However, in at least one of the various embodiments, a data structure explicitly named "inode" may be absent, but these file systems may have data structures that store data similar to inodes and may provide capabilities similar to inodes as described herein. Also, in at least one of the various embodiments, inode data may be referred to as stat data, so named in reference to the stat system call that provides the data to processes.

"Data block" as used herein refers to file based data structures that may be the basic unit for data contained in a file. One or more data blocks may be associated with an inode or using various well-known data structures such as b-trees, linked lists, or the like. In at least one of the various embodiments, data blocks may include meta-data (e.g., one or more pointers) that reference physical blocks on a storage device.

"Directory entry" as used herein refers to a record in a distributed file system. Directory entries may include file system data such as inodes and data blocks. Generally, directory entries are data and information managed and stored in a file system.

"Logical Inode Number," "LIN," and "entry-ID" as used herein refer to reference values that may be used by clients of the distributed file system to identify and reference inodes or directory entries.

"Snapshot-ID" as used herein refers to an identifier used to reference a particular snapshot in a distributed file system. Usually, a snapshot-ID references a read-only portion of the distributed file system. In some cases, in at least one of the various embodiments, snapshot-IDs may reference live/writable portions of a distributed file system.

"Generation-ID" as used herein refers to an identifier that may be included as part of a directory entry. In general operation the generation-ID for a directory entry may be incremented each time the directory entry is modified. In snapshot operations the generation-ID may be used to contain a value that references an alias snapshot-ID.

"Alias-ID" as used herein refers to a snapshot-ID for a snapshot that is designated for being a snapshot alias. In at least one of the various embodiments, it may be a snapshot-ID that is stored in the generation-ID field of a directory entry.

"Snapshot Tracking File" as used herein refers to a directory entry that is specialized to reference snapshots. Snapshot Tracking File data structures may include and/or reference snapshot-IDs, generation-IDs, inodes, or the like.

"Snapshot Alias File" as used herein refers to a specialized Snapshot Tracking File that may be employed for aliasing snapshots. In at least one of the various embodiments, the data structures used for Snapshot Alias Files may be similar to those used for Snapshot Tracking Files. In some embodiments the distinction may be implemented using a flag or any other sentinel attribute in the Snapshot Tracking File.

The following briefly describes at least one of the various embodiments, in order to provide a basic understanding of some aspects of the claimed subject matter. This brief description is not intended as an extensive overview. It is not intended to identify key or critical elements or to delineate or otherwise narrow the scope. Its purpose is merely to present some concepts in a simplified form as a prelude to the more detailed description that is presented later.

Briefly stated, the various embodiments are directed towards enabling access to files in a distributed file system. The distributed file system may receive a file system operation request that includes at least an entry-ID and a snapshot ID. In at least one of the various embodiments, file system operation requests may include operations such as reads, writes, moves, or the like. The entry-ID may identify directory entries for a file that the file system operation may be directed towards. Directory entries for snapshot tracking files that match the snapshot-ID may be looked up and retrieved from the distributed file system to determine in which, if any, snapshot the file corresponding to the entry-ID may be stored. The retrieved snapshot tracking file directory entry may also be arranged to include a generation-ID. In at least one of the various embodiments, if a value of the generation-ID and the snapshot-ID in the retrieved snapshot tracking file directory entry are different, another snapshot tracking file directory entry may be looked up and retrieved from the distributed file system using the value of the generation-ID as a snapshot-ID. Thus, in this case, the generation-ID from the directory entry for the first snapshot tracking file (e.g., a snapshot alias file) may be used as the snapshot-ID for identifying the target snapshot of the snapshot alias. Then, in at least one of the various embodiments, the initially requested file system operation may be performed on the directory entry for a file retrieved from the target snapshot using the entry-ID and the target snapshot-ID.

In at least one of the various embodiments, as directory entries for snapshot alias files are retrieved for aliased snapshots they may be stored in a cache to avoid file system lookups for snapshot tracking files for the same snapshot-ID. Also, in at least one of the various embodiments, before looking up and retrieving a directory entry for a snapshot tracking file, the cache may be checked to see if the directory entry was previously retrieved indicating that it may be an aliased snapshot.

In at least one of the various embodiments, the snapshot-ID for a directory entry may be mapped to live writable portion of the distributed file system rather than mapping to the snapshot file system. In some embodiments, special snapshot-ID values may be defined to indicate that the live file system should be used rather than a snapshot file system. Also, in at least one of the various embodiments, file system clients may be provided file handles for identifying directory entries such that the file handles are associated with entry-IDs and the snapshot-IDs of their respective directory entries.

Further, in at least one of the various embodiments, some directory entries, such as, Snapshot Alias Files, may be modified to reference a different snapshot if the file system receives an alias request that includes at least a snapshot-ID, and an alias-ID. The directory entry, such as, the Snapshot Alias File that corresponds to the snapshot-ID may be looked up and retrieved. Then a new generation-ID for the directory entry may be generated based on the alias-ID. This new generation-ID may be stored in the generation-ID field of the directory entry for the snapshot alias file before it is saved to the distributed file system.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include network devices 112 and 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, network devices 112 and 114 may include module, processes, components, services, or the like, operating as one or more file systems and/or clustered file systems.

Also, in at least one of the various embodiments, enclosure of blade servers 110, enclosure of enclosure of server computers 116, super computer network device 118 may include network devices that comprises a clustered file system. Likewise, in at least one embodiment, at least one blade server or at least one server computer may be arranged use a file system and/or clustered file system.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like. Each client device may also include hardware and/or software components for accessing a network file system and/or clustered file system.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), Local Area Networks (LANs), Campus Area Networks (CANs), Metropolitan Area Networks (MANs), Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), 5th (5G), 6th (6G), generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, HSDPA, LTE and the like.

Enclosure of Blade Servers

Figure 2A:
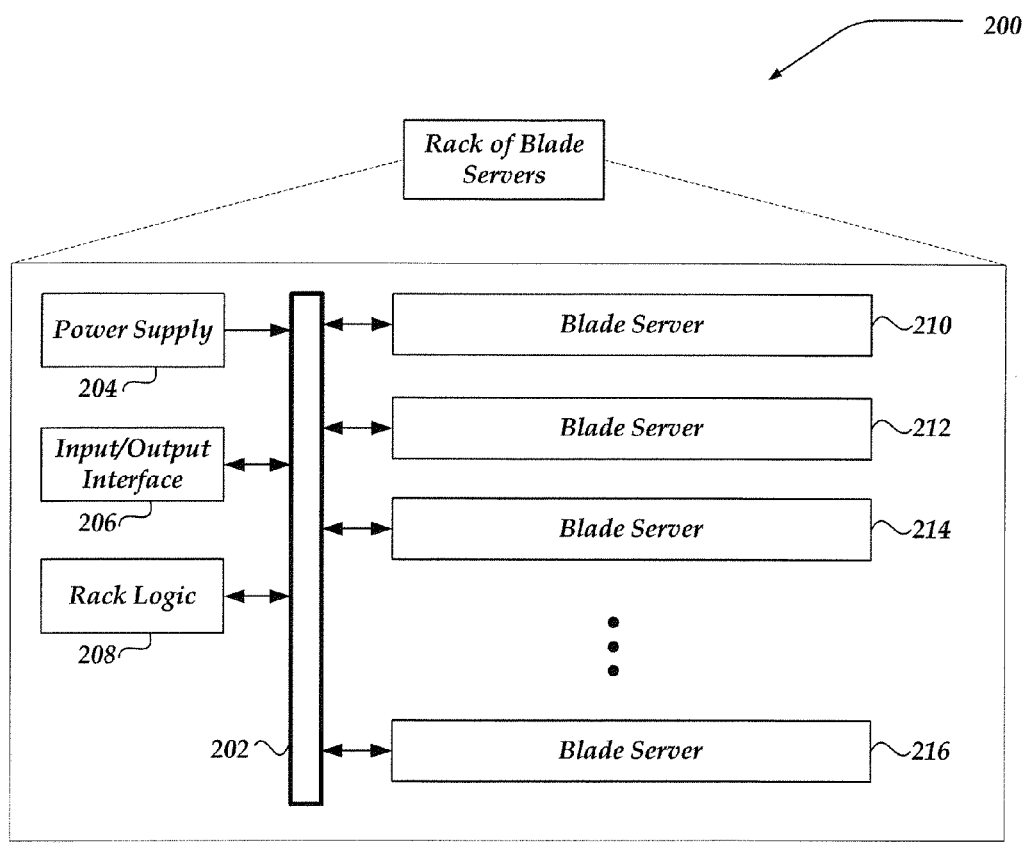
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade servers 210, 212, 214, and 216, and blade server interconnect 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
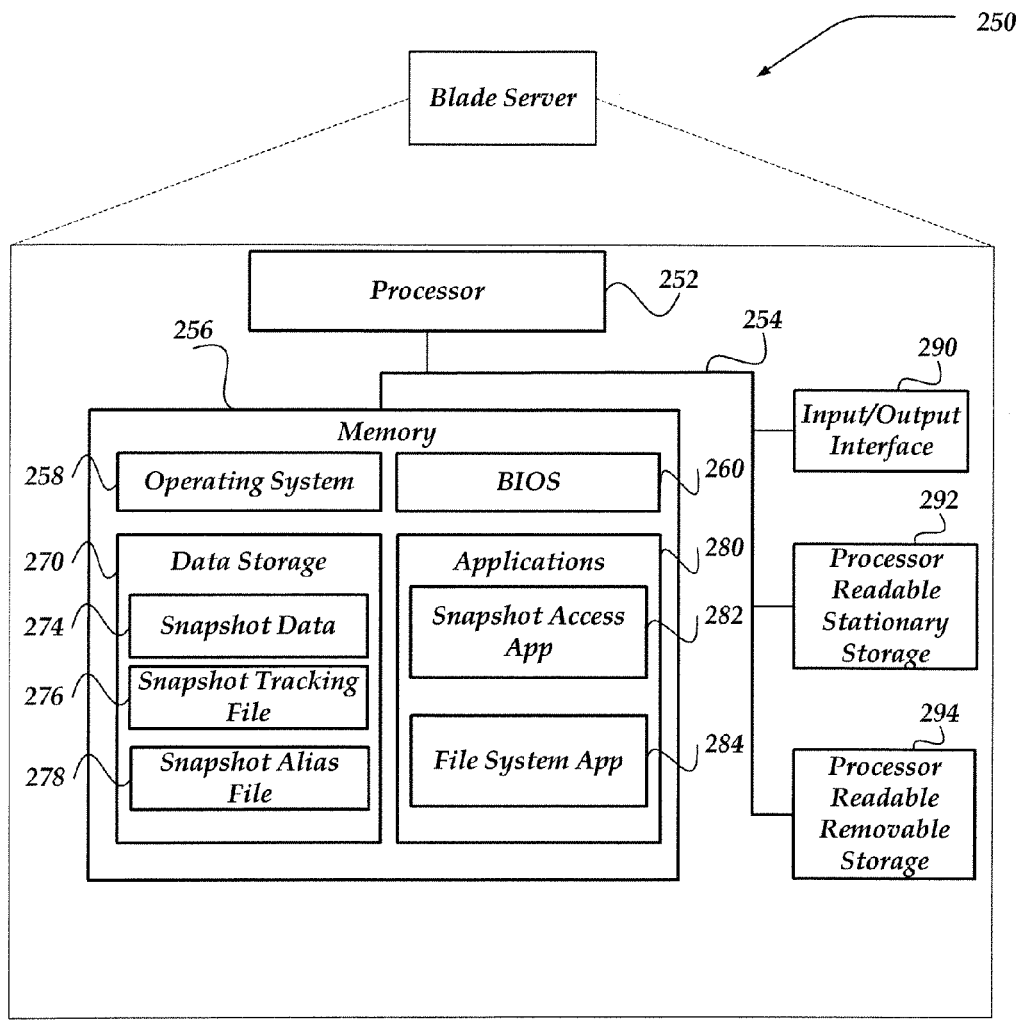
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions such as those described in conjunction with FIGS. 5-8. In one embodiment, at least some of datastore 270 might also be stored on another component of blade server 250, including, but not limited to, processor-readable removable storage device 294, processor-readable stationary storage device 292, or any other non-transitory processor-readable storage device (not shown). Data storage 270 may include, for example, Snapshot Data 274, Snapshot Tracking File 276, Snapshot Alias File 278, or the like. Snapshot Data 274 is arranged to store data for file system snapshots, as well as other supporting data. Likewise, Snapshot Tracking File 276 may be memory used to hold information and meta-data used for snapshot operations, or the like. And, Snapshot Alias File 278 may be used to hold information and meta-data for snapshot aliasing.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, Snapshot Access Application 282, and File System Application 284, which may be enabled to perform actions further described below starting with at least FIG. 5. Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, Snapshot Access Application 282, and File System Application 284 may be operative in a cloud-based computing environment. In at least one of the various embodiments, these applications, and others, may be executing within virtual machines and/or virtual servers that may be managed in a cloud-based based computing environment. In at least one of the various embodiments, in this context the applications may flow from one physical blade server and/or network device within the cloud-based environment to another depending on performance and scaling considerations automatically managed by the cloud computing environment. Likewise, in at least one of the various embodiments, virtual machines and/or virtual servers for Snapshot Access Application 282, or File System Application 284 and may be provisioned and de-commissioned automatically.

Also, in at least one of the various embodiments, Snapshot Data 274, and Snapshot Tracking File 276, Snapshot Alias File 278, or the like, may be located on virtual servers running in a cloud-based computing environment rather than being tied to one or more specific physical blade servers.

Illustrative Client Device

Figure 3:
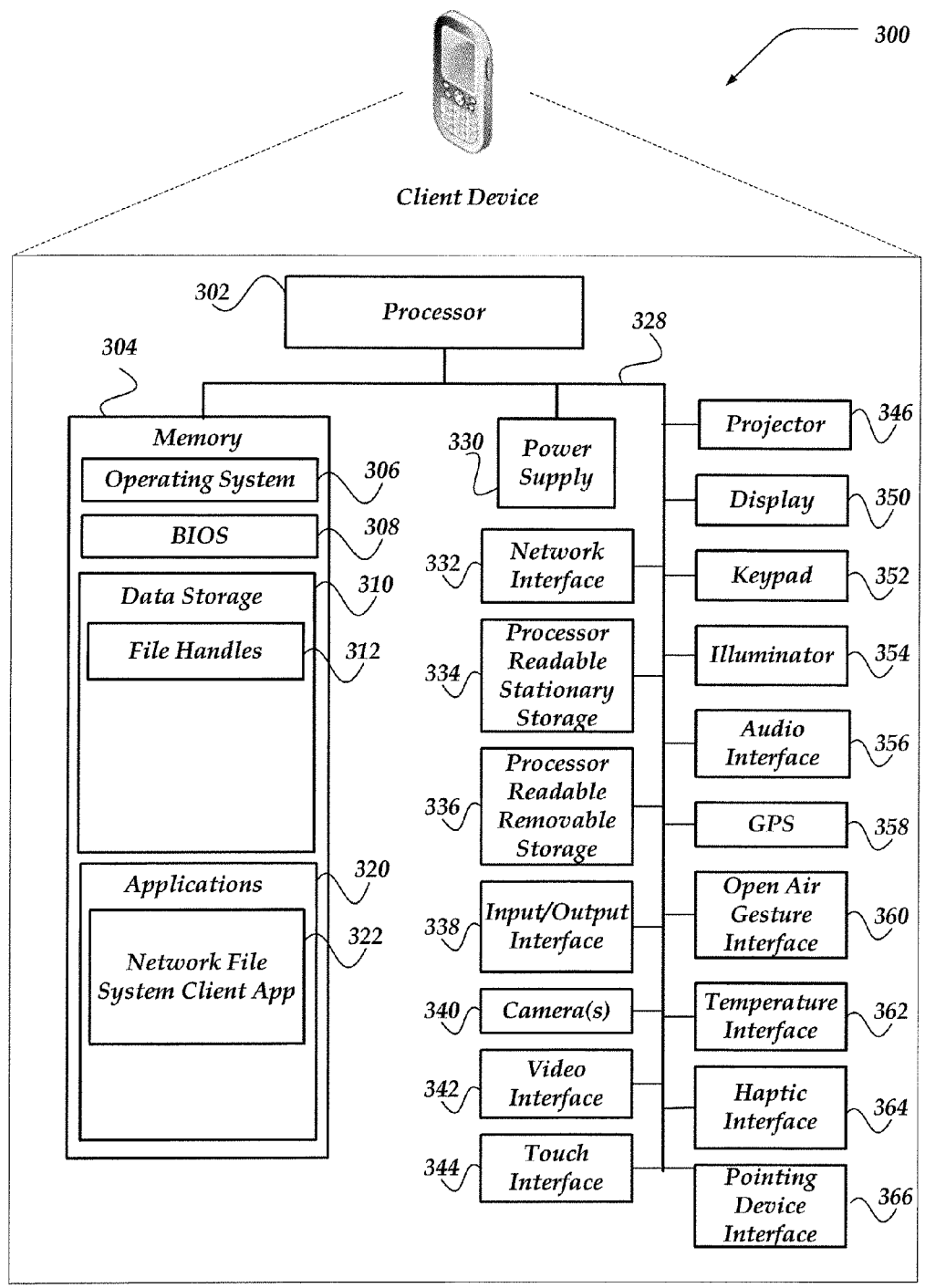
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or Linux™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. Data storage 310 may also include File Handles 312, or the like. File Handles 312 may be arranged to store data for file system operations, as well as other supporting data. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by mobile device 300, transmit, receive, and/or otherwise process instructions and data. Applications 320 may include, for example, Network File System Client Application 322. Network File System Client Application 322 may be arranged to perform file system operations on a network file system by communicating commands and data over a network.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
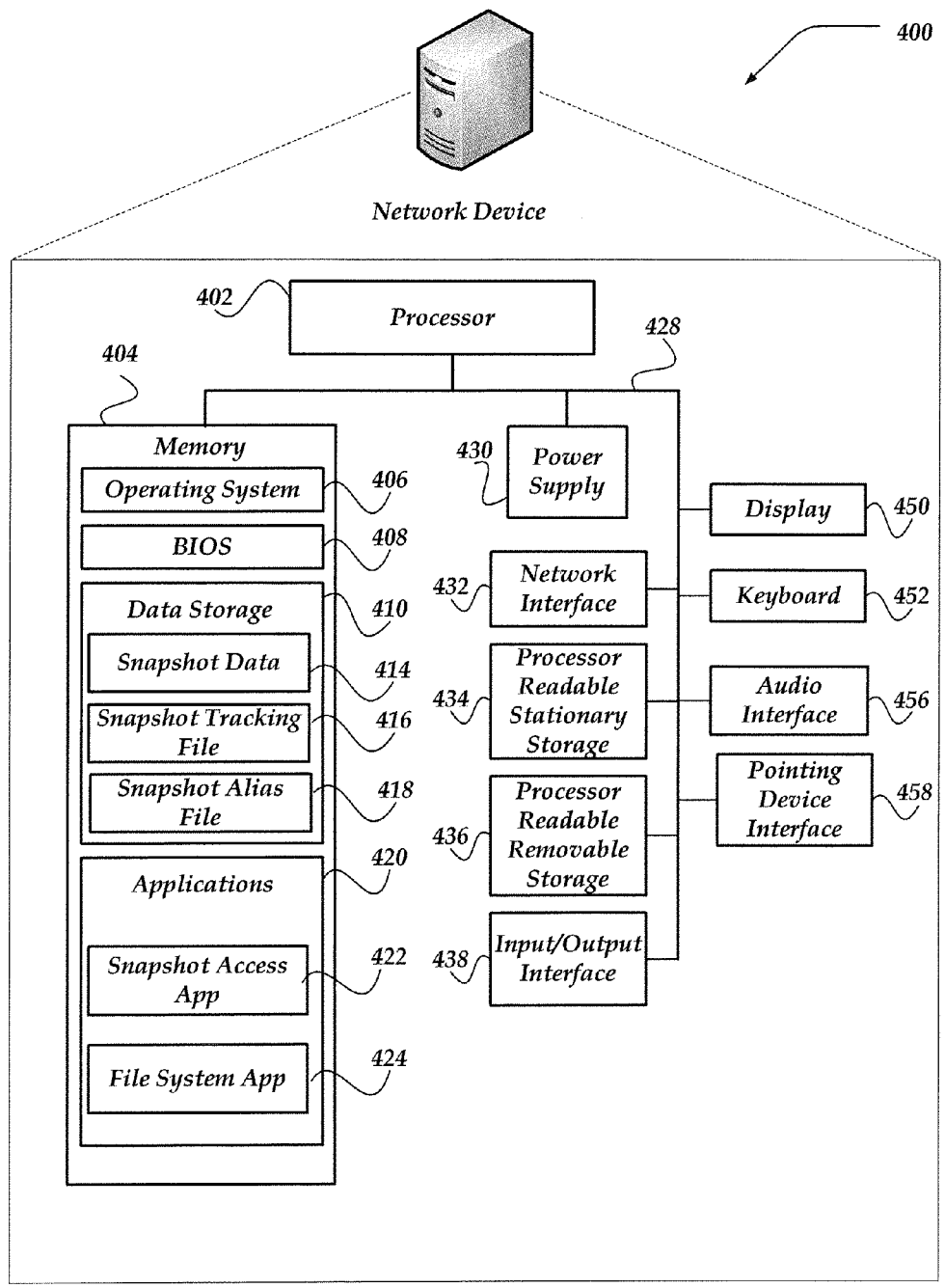
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing these innovations. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or Linux™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those action describe in conjunction with FIGS. 5-8. In one embodiment, at least some of data storage 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include Snapshot Data 414, Snapshot Tracking File 416, Snapshot Alias File 418, or the like. Snapshot Data 414 may be arranged to store data for file system snapshots, as well as other supporting data. Likewise, Snapshot Tracking File 416 may be memory used to hold information and meta-data for snapshot for operations, or the like. Also, Snapshot Alias File 418 may be used to hold information and meta-data for snapshot aliasing, or the like.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include Snapshot Access Application 422, or File System Application 424 which may be enabled to perform actions further described below starting with at least FIG. 5. In at least one of the various embodiments, while they may be illustrated here as separate applications, Snapshot Access Application 422, or File System Application 424 may be implemented as modules and/or components of the same application. Further, in at least one of the various embodiments, Snapshot Access Application 422, or File System Application 424 may be implemented as operating system extensions, modules, plugins, or the like.

Furthermore, in at least one of the various embodiments, Snapshot Access Application 422, or File System Application 424 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network device within the cloud-based environment to another depending on performance and scaling considerations automatically managed by the cloud computing environment. Likewise, in at least one of the various embodiments, virtual machines and/or virtual servers dedicated to running Snapshot Access Application 422, or File System Application 424 may be provisioned and de-commissioned automatically.

Also, in at least one of the various embodiments, Snapshot Data 414, Snapshot Tracking File 416, Snapshot Alias File 418, or the like, may be located in virtual servers running in a cloud-based computing environment rather than being tied to one or more specific physical blade servers or server computer devices.

Illustrated Logical Architecture

Figure 5:
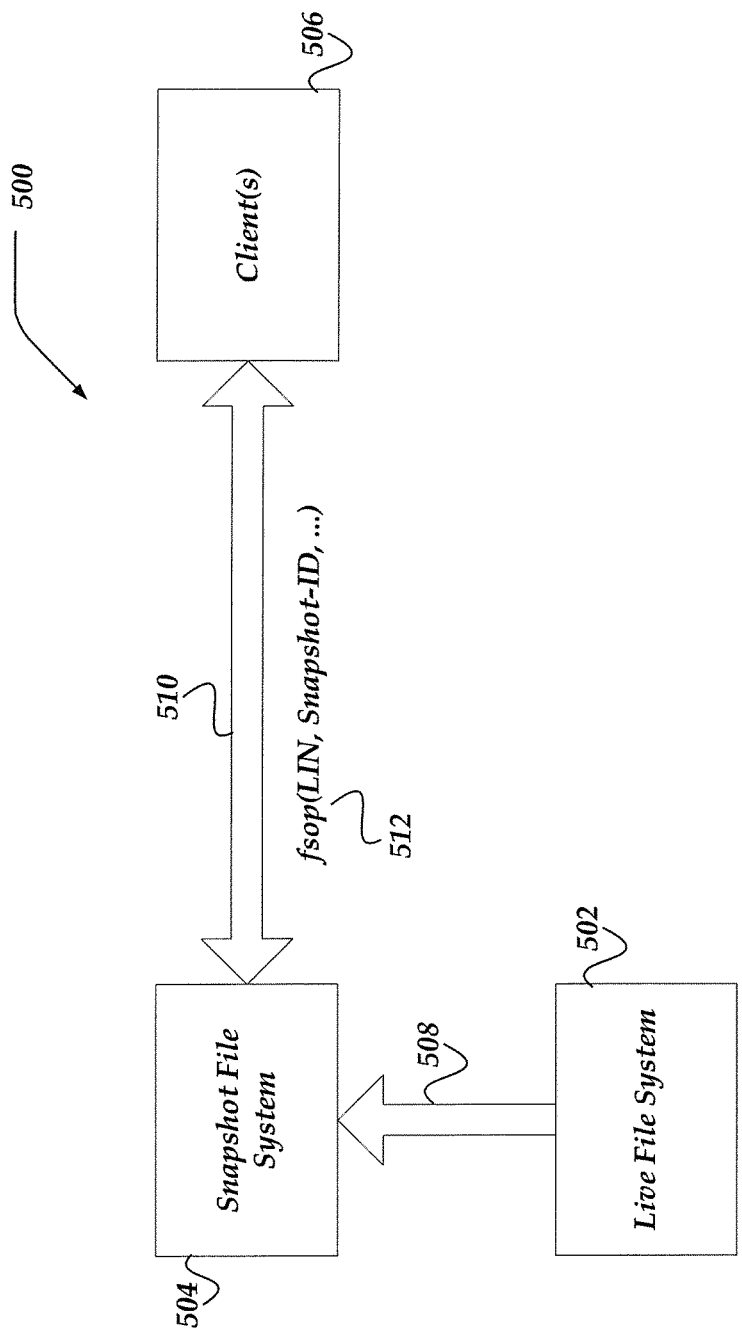
FIG. 5 illustrates a logical schematic of a distributed file system that has a snapshot file system in accordance with at least one of the various embodiments.
Figure 6:
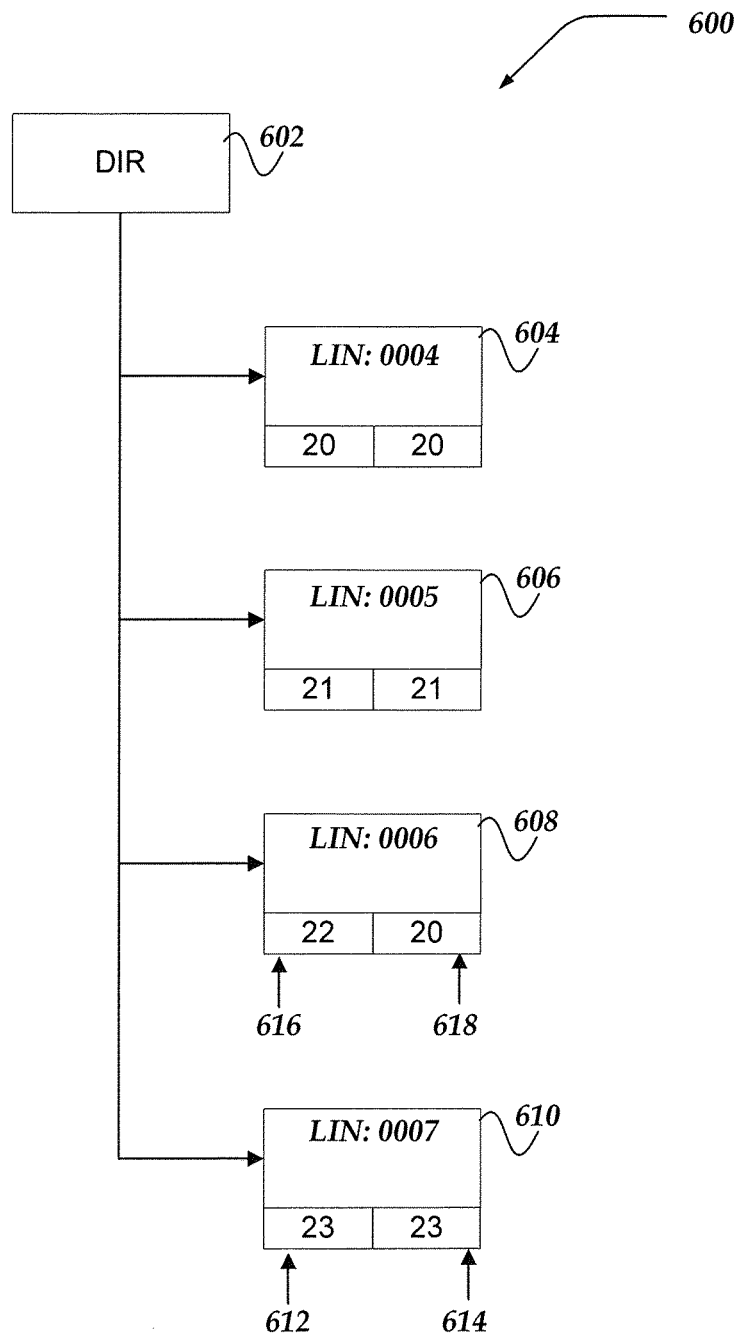
FIG. 6 illustrates a logical schematic of snapshot tracking files and snapshot alias file entries in distributed file system in accordance with at least one of the various embodiments.

FIGS. 5-6 are presented to illustrate and clarify the logical architecture for at least one of the various embodiments.

FIG. 5 illustrates a logical schematic for distributed file system 500 that has a snapshot file system in accordance with at least one of the various embodiments. In at least one of the various embodiments, a distributed file system may include various components and/or constituents. In at least one of the various embodiments, a distributed file system may be arranged into a live file system, such as, live file system 502. Live file system 502 may include one or more volumes of storage that may be receiving writes and read of data from various sources. In this example, live file system 502 may be considered a read and writable file system.

In at least one of the various embodiments, in some distributed file systems there may be a large number of clients reading and writing to files such that at any given time it may be difficult to determine a stable state. In at least one of the various embodiments, clients may be concurrently reading and writing the same file. Accordingly, in at least one of the various embodiments, snapshots of live file system 502 that may be stable snapshots (versions) of the file system may be written to a snapshot file system, such as, snapshot file system 504.

In at least one of the various embodiments, snapshot file system 504 may contain multiple snapshots of the data stored in live file system 502. A file system application may be configured to generate snapshots at various time intervals, such as, weekly, daily, hourly, every two hours, every 10 minutes, or the like. For example, in at least one of the various embodiments, a file system process, such as, file system application 284, may be configured to generate snapshots of live file system 502 every ten minutes. In this example, read-only snapshots of the data stored in live file system 502 may be stored in snapshot file system 504 every ten minutes. Network 508 may illustrate the one or more network paths that may be used to transfer data and/or directory entries from live file system 502 to snapshot file system 504.

In at least one of the various embodiments, clients 506 may communicate with snapshot file system 504 over a network, such as, network 510. In at least one of the various embodiments, to access data that is included in a particular snapshot, file operations originating from clients 506 may include a parameter that indicates which snapshot the file operation is directed towards. For example, fsop 512 illustrates a generic example of a file system operation that includes parameters sufficient to illustrate at least one of the various embodiments. In this example, a Logical Inode Number (LIN) and a Snapshot-ID are provided with the file system operation. In at least one of the various embodiments, the LIN may be used to identify the directory entry of interest (the file) and the Snapshot-ID may be used to identify which snapshot version of the directory entry the operation should be performed on. In at least one of the various embodiments, at least one Snapshot-ID value may be designated as referencing the live file system rather than a snapshot. For example, in at least one of the various embodiments, a Snapshot-ID of −1 may be configured to represent the live file system rather than referencing a snapshot in the snapshot file system. Clearly, one of ordinary skill in the art will appreciate that additional parameters may be supplied in file system operation calls, depending the particular implementation of the file system and/or the current application, such as, modes (read-only, writeable, append, or the like), lock requests, or the like, or combinations thereof.

In at least one of the various embodiments, multiple concurrent file system operations may be directed toward directory entries stored in snapshot file system 504. Further, in at least one of the various embodiments, one or more client devices may be making independent file system operation calls directed at snapshot file system 504. Also, in at least one of the various embodiments, clients may execute one or more file system operations against snapshot file system 504 and may execute one or more file system operations on live file system 506. These operations may be intermingled between the live file system and the snapshot file system as needed, based on the needs and/or configuration of the various applications that may be accessing directory entries.

In at least one of the various embodiments, even though snapshot file system 504 and live file system 502 may be illustrated as being separate, they may be implemented such that they are operative on the same network device, multiple network devices, in a cloud based environment, network device clusters, or the like.

FIG. 6 illustrates a logical schematic for a portion of snapshot system 600 that includes directory entries for snapshot tracking files and snapshot alias files, in accordance with at least one of the various embodiments. In at least one of the various embodiments, a snapshot directory, such as, directory 602 may be arranged to include one or more references to directory entries for snapshot tracking file and/or snapshot alias files that may correspond to one or more snapshots. In at least one of the various embodiments, directory entries 604, 606, and 610 each represent snapshot tracking files for different snapshots. Likewise directory entry 608 may represent a snapshot alias file.

In at least one of the various embodiments, each directory entry may include a snapshot-ID and a generation-ID. In this example, for directory entry 610, snapshot-ID 612 has a value of 23 and generation-ID 614 has a value of 23. Likewise, in this example, directory entries 604 and 606 have snapshot-ID of value 20 and generation-ID of value 20, and snapshot-ID of value 21 and generation-ID of value 21, respectively. And, in this example, directory entry 608 has a snapshot-ID value of 22 and a generation-ID value of 20 (snapshot-ID 616 and generation-ID 618, respectively).

In at least one of the various embodiments, each directory entry may include a snapshot-ID and a generation-ID. The snapshot-ID may indicate the particular snapshot the directory entry is associated with. And, the generation-ID may indicate a generation for the directory entry. In at least one of the various embodiments, generation-IDs may be used for various administrative functions associated with the operation of a distributed file system, such as, consistency checks across caches or storage volumes, or the like.

In at least one of the various embodiments, directory entries may have their generation-IDs incremented as updates to the directory entries are committed to storage. For example, when a directory entry is first created it may be assigned a generation-ID of 00. Later, if a client modifies the directory entry (writes data) the generation-ID of the directory entry may be incremented to 01. A subsequent write may result in the generation-ID being incremented to 02. One of ordinary skill in art can appreciate how a generation-ID may be used to compare copies of a directory entry to determine if they are consistent. In a distributed file system where portions of files may be stored on different nodes and/or in various caches, the generation-ID may be employed during file system operations to help ensure file system consistency. Note, generation-IDs may be incremented in response to file system operations that modify the directory entry.

In at least one of the various embodiments, directory entries for normal files included in snapshots may be read-only. In contrast, directory entries for snapshot tracking files may be renamed, deleted, and/or have their expiration date modified, or the like. However, in at least one of the various embodiments, snapshot access applications (e.g., snapshot access app 282 or snapshot access app 422) and/or file system applications (e.g., file system app 284 or file system app 424) may be arranged to ensure that the generation-ID of directory entries for snapshot tracking files remain unchanged. Thus, in at least one of the various embodiments, for a given snapshot tracking file directory entry, the snapshot-ID and the generation-ID should normally be the same. This property may be relied on to determine if the directory entry is a snapshot tracking file directory entry or if it is a snapshot alias file directory entry with a different target snapshot.

In at least one of the various embodiments, at various times it may be advantageous to transparently redirect and/or alias one snapshot-ID to another. In at least one of the various embodiments, snapshot-IDs may be aliased by snapshot access applications 282 and 422, file system 284 and 424, or the like. Snapshot aliasing may enable the file system to dynamically and/or transparently change which snapshot version of a directory entry may be used to respond to a client's file operation. The aliasing may be transparent in the sense that the client may not be aware of the indirection and/or the client does not have to update or change the locally held file handles it may have obtained that point a directory entry that is included in a snapshot.

In at least one of the various embodiments, aliased snapshots in a snapshot file system may be indicated if the snapshot-ID for a snapshot tracking file directory entry is different than the generation-ID. In this case the directory entry may be from a snapshot alias file rather than a snapshot tracking file. In this example, snapshot directory entry 608 represents a snapshot alias file for a snapshot that has been aliased such that it refers to data associated with another snapshot rather the snapshot it was originally associated with. In the example, directory entry 608 includes snapshot-ID 616 with a value of 22 and generation-ID 618 having a value of 20. As mentioned, if the snapshot-ID and the generation-ID for a directory entry are different then the directory entry may be considered to be from a snapshot alias file.

In this example, in at least one of the various embodiments, client file operations (such as reads) directed towards a directory entry for a file that is part of snapshot version 22 will be redirected to snapshot version 20. However, as far as the client is concerned, it is still reading the directory entry contents from snapshot version 22. Though, in some cases, the client may be aware of the indirection, or it may have even triggered the indirection, the transparency of the aliasing operation remains advantageous because the active/open file handles used by the client will not have to be updated to accommodate the indirection.

In at least one of the various embodiments, given that file operations directed to snapshot tracking files in directory 600 may be occurring in the distributed file system cluster, various portions of the directory contents may be stored on one or more nodes within the cluster. Also, in at least one of the various embodiments, portions of the directory contents may be stored in one or more node caches, or the like. Thus, in at least one of the various embodiments, each lookup and/or retrieval of directory entries and/or directory entry information may be retrieval of data that is stored on one or more other nodes included the file system cluster. For example, in at least one of the various embodiments, snapshot tracking files and snapshot alias files may be stored across a plurality of nodes within a distributed file system Also, in at least one of the various embodiments, for some operations, the directory entry information that may be located in node caches may need to be flushed to stable storage before retrieval. These and other operations may trigger cluster-wide actions that may have indeterminate latency, such as, directory entry locking, node cache flushing, or the like. Thus, using the snapshot-ID and the generation-ID as described, enables the file system to determine if the snapshot version is aliased as well as providing the alias snapshot-ID (in the generation-ID) without requiring a second distributed operation to retrieve the snapshot alias file. Further, the snapshot-ID and generation-ID may be employed as part of a cache key to quickly test if the directory entry for the snapshot alias file has already been retrieved from the file system.

In at least one of the various embodiments, the directory entries included in directory 600 may be snapshot tracking files and snapshot alias files. Moreover, one of ordinary skill in that will appreciate that directory entries for snapshot tracking files and/or snapshot alias files may be implemented using various data structures having additional and/or different meta-data fields, or the like, than shown. However, FIG. 6 includes sufficient detail to enable the innovations herein to be implemented and practiced.

Generalized Operation

Figure 7:
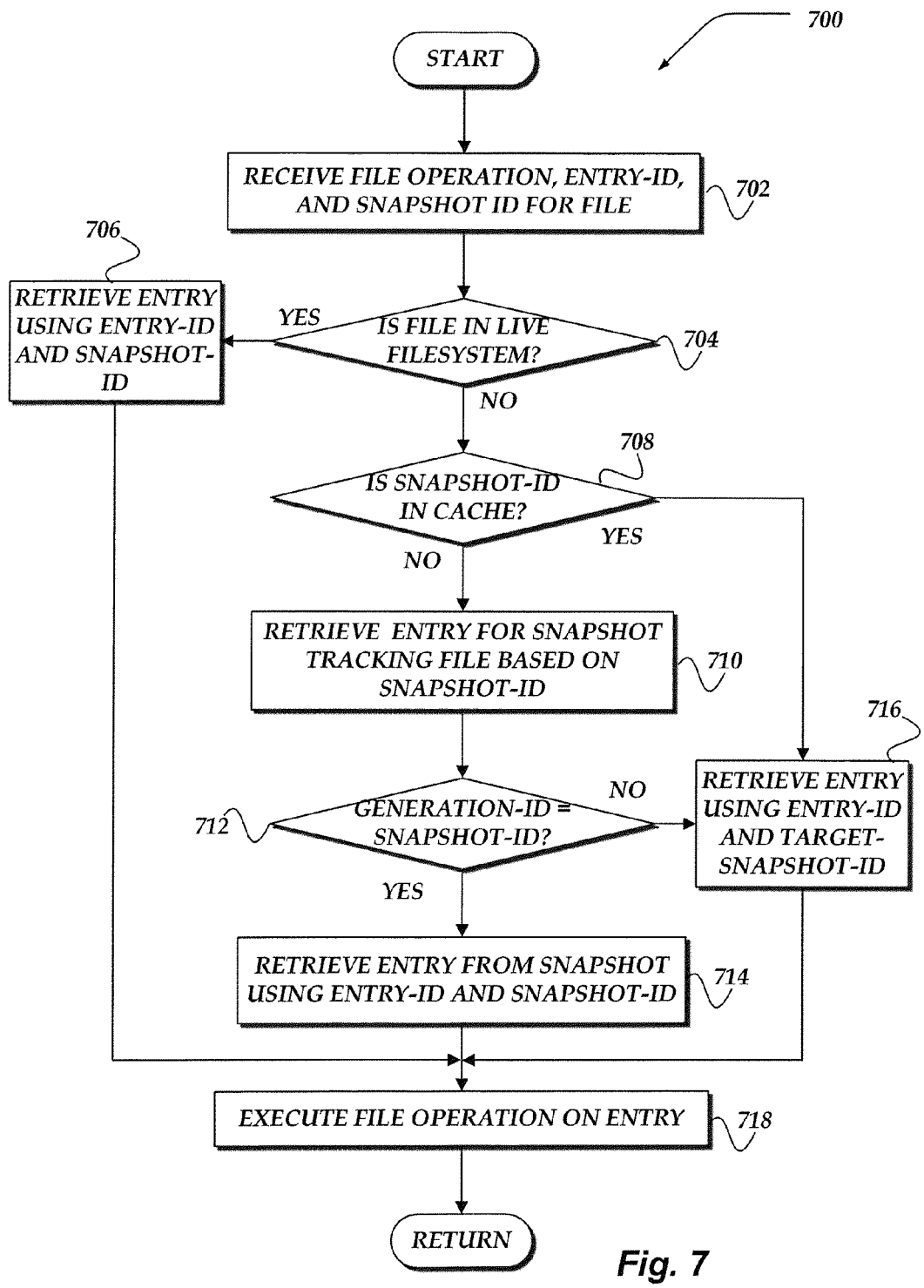
FIG. 7 shows a flowchart for a process for performing operations on directory entries in a distributed file system in accordance with at least one of the various embodiments.
Figure 8:
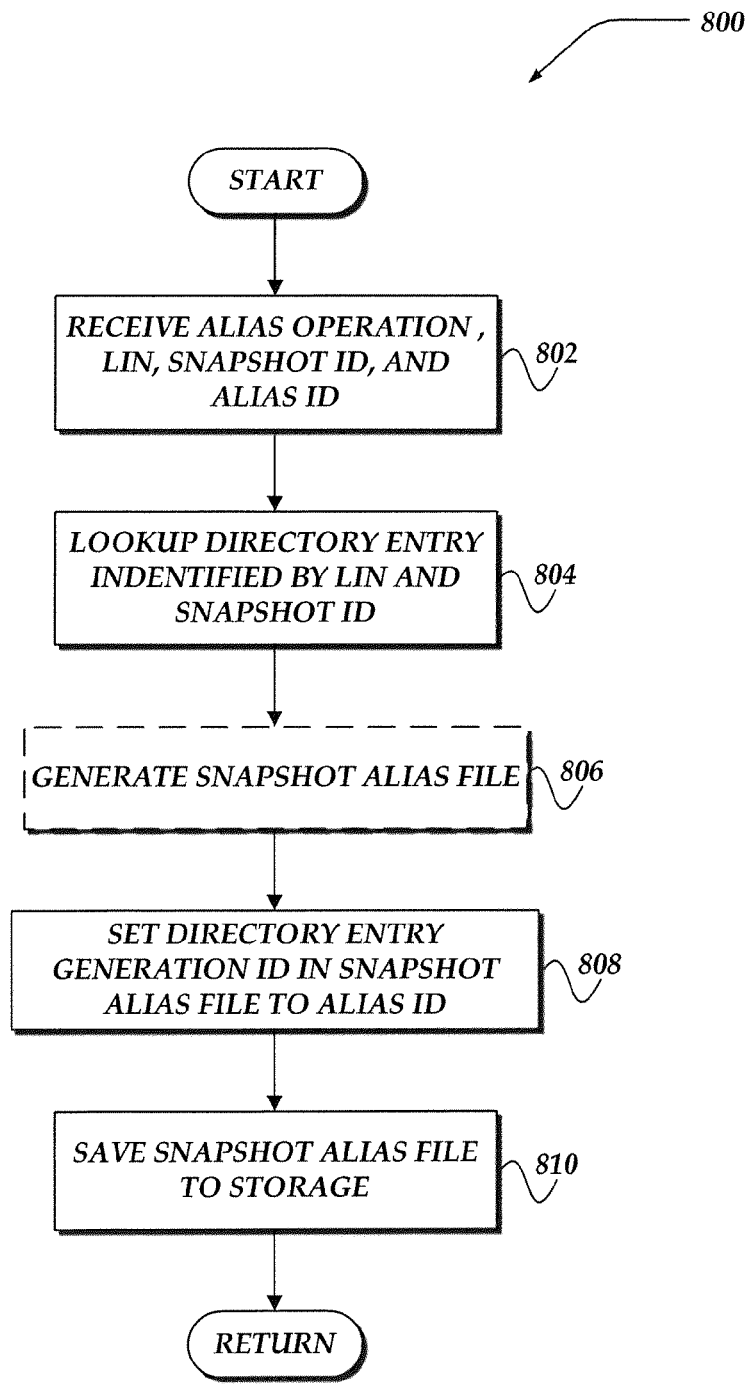
FIG. 8 shows a flowchart for a process for generating snapshot aliases for directory entries in a distributed file system in accordance with at least one of the various embodiments.

FIGS. 7-8 represent the generalized operations of dynamic network access of snapshot versions of directory entries in a clustered distributed file system in accordance with at least one of the various embodiments. In at least one of the various embodiments, processes 700, and 800 described in conjunction with FIGS. 7-8 may be implemented by and/or executed on a single network device, such as network device 400 of FIG. 4. In other embodiments, these processes or portions thereof may be implemented by and/or executed on a plurality of network devices, such as network device 400 of FIG. 4. In yet other embodiments, these processes or portions thereof may be implemented by and/or executed on one or more blade servers, such as blade server 250 of FIG. 2B. However, embodiments are not so limited, and various combinations of network devices, blade servers, or the like may be utilized. Further, in at least one of the various embodiments, the processes described in conjunction with FIGS. 7-8 may be operative in distributed file system architectures such as those described in conjunction with FIGS. 5-6. In at least one of the various embodiments, at least some of the directory entries used in processes 700 and 800 may be Snapshot Alias Files.

FIG. 7 shows a flowchart for process 700 for performing operations on directory entries in a distributed file system in accordance with at least one of the various embodiments. After a start block, at block 702, a file system operation that includes a directory entry-ID for a file and a snapshot-ID may be provided to a distributed file system. In at least one of the various embodiments, the snapshot-ID may be absent, in such cases, the file system may provide default value.

In at least one of the various embodiments, the directory entry-ID may be a data structure, or it may reference a data structure, that includes sufficient information for the distributed file system to identify and locate the file and other data that may be associated with the directory entry. The snapshot-ID may be used to further narrow down the selection to a directory entry that may be associated with a snapshot version.

In at least one of the various embodiments, the default snapshot-ID value may be set to the most recent snapshot. Or, in at least one of the various embodiments, the default snapshot value may be configured to point to the most recent version of the directory entry, even if the most recent version is not associated with a snapshot. In these cases, in at least one of the various embodiments, the default may resolve to a writable version to the directory entry that may be in the live file system.

At decision block 704, in at least one of the various embodiments, if the file is located in the live file system (rather than in the snapshot file system), control may flow to block 706. Otherwise, in at least one of the various embodiments, control may flow to decision block 708.

In at least one of the various embodiments, a snapshot-ID may be arranged to hold particular value, such as, '−1' that may indicate that the file system operation may be directed towards a file that may be located in the live file system (e.g., not a snapshot file). Also, in at least one of the various embodiments, an empty or null value for snapshot-ID may indicate that the file operation may be directed towards of file in the live file system.

At block 706, in at least one of the various embodiments, retrieve the directory entry for the file from the live file system using the supplied entry-ID and snapshot-ID. In at least one of the various embodiments, this may be considered a "normal" file lookup operation since the snapshot-ID value indicates that the directory entry for the file located in the live file system rather than in a snapshot. Next, in at least one of the various embodiments, control may flow to block 718.

At decision block 708, in at least one of the various embodiments, if the snapshot-ID is in a local cache, control may flow to block 716; otherwise, control may flow to block 710.

In at least one of the various embodiments, if the snapshot-ID that was received is in the cache, this may indicate that the snapshot-ID provided with the file system operation may be actually a snapshot alias-ID. Accordingly, read the target snapshot-ID for the snapshot alias from the snapshot alias file directory entry that may be found in the cache rather than looking it up from the file system.

At block 710, in at least one of the various embodiments, retrieve the directory entry for the snapshot tracking file based on the snapshot-ID. In at least one of the various embodiments, this operation may be retrieving a snapshot tracking file that may include meta-data related to the snapshot where the directory entry for the requested file may be stored.

At decision block 712, in at least one of the various embodiments, if the snapshot-ID and generation-ID in the directory entry for the snapshot tracking file have the same value, control may flow to block 714. Otherwise, in at least one of the various embodiments, control may flow to block 716. In at least one of the various embodiments, if the snapshot-ID does not equal the generation-ID it may indicate that the snapshot-ID passed in with the file operation has been aliased. Accordingly, in at least one of the various embodiments, the actual target snapshot-ID may be the value of the generation-ID.

In at least one of the various embodiments, the retrieved snapshot alias file directory entry may be added to a cache using the target snapshot-ID as the hash key.

At block 714, in at least one of the various embodiments, the directory entry for the requested file may be retrieved from the snapshot file system using the entry-ID and the snapshot-ID that was provided with the file operation.

At block 716, in at least one of the various embodiments, the directory entry for the requested file may be retrieved from the snapshot file system using the entry-ID and the target snapshot-ID that was retrieved using the snapshot-ID that was provided with the file operation.

At block 718, in at least one of the various embodiments, execute the provided file system operation on the directory entry for the file. Next, in at least one of the various embodiments, control may be returned to a calling process.

FIG. 8 shows a flowchart for process 800 for generating or modifying directory entries for snapshot alias files in a distributed file system in accordance with at least one of the various embodiments. After a start block, at block 802, in at least one of the various embodiments, a snapshot application may receive a command to perform an alias operation for a snapshot. In at least one of the various embodiments, this may include parameters such as, entry-ID, snapshot-ID, an alias snapshot-ID, or the like.

At block 804, in at least one of the various embodiments, the directory entry for the snapshot tracking file corresponding to the provided snapshot-ID may be retrieved using the file system.

At block 806, in at least one of the various embodiments, optionally a new snapshot alias file may be generated to represent the pending alias operation. Alternatively, in at least one of the various embodiments, an existing snapshot alias file may be retrieved and used if an alias is being modified rather than created.

At block 808, in at least one of the various embodiments, the generation-ID of the directory entry for the snapshot alias file may be set to the snapshot-ID of the snapshot that has been designated to be the alias snapshot. In at least one of the various embodiments, the alias target snapshot-ID may be set by updating a field in the snapshot alias file directory entry such as generation-ID 618 (in FIG. 6).

At block 810, in at least one of the various embodiments, after the generation-ID has been set to the snapshot-ID of the alias target snapshot version, the snapshot alias file may be saved to stable storage that may be associated with a snapshot file system.

Next, in at least one of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for enabling a network device to access files in a distributed file system, comprising:
   receiving an operation request from a client that includes at least an entry-ID for a file and a snapshot ID;
   retrieving a snapshot tracking file directory entry from the distributed file system based on the snapshot-ID, wherein the retrieved snapshot tracking file directory entry includes a generation-ID;
   determining if the generation-ID and the snapshot-ID are dissimilar;
   in response to determining the generation-ID and the snapshot-ID are dissimilar, retrieving a second snapshot tracking file directory entry from the distributed file system based on the value of the generation-ID, wherein the snapshot-ID is set to the value of the generation-ID;
   retrieving a directory entry for the file from the second snapshot tracking file directory based on the entry-ID and the snapshot-ID;
   performing the operation request on the retrieved directory entry for the file, wherein the performing of the operation request based on the second snapshot tracking file directory is transparent to the client;
   receiving an alias request that includes at least the snapshot-ID, and an alias-ID;
   retrieving the snapshot tracking file directory entry that corresponds to the snapshot-ID; and
   generating a new generation-ID for a new snapshot alias file directory entry that corresponds to the alias-ID and saving the new snapshot alias file directory entry in the distributed file system.

2. The method of claim 1, further comprising, storing the second snapshot tracking file directory entry in a cache.

3. The method of claim 1, wherein retrieving the second snapshot tracking file directory entry, further comprises, determining if the second snapshot tracking file directory entry is available in a cache before retrieving the second snapshot tracking file directory entry from the distributed file system.

4. The method of claim 1, further comprising, associating the generation-ID of the directory entry to a writable file system.

5. The method of claim 1, further comprising, generating at least one file handle that corresponds to the entry-ID and the snapshot-ID.

6. A network device for enabling access to files in a distributed file system, comprising:
   a transceiver for communicating over the network;
   a memory for storing at least instructions;
   a processor device that is operative to execute instructions that enable actions, including:
      receiving an operation request that includes at least an entry-ID for a file and a snapshot ID;
      retrieving a snapshot tracking file directory entry from the distributed file system based on the snapshot-ID, wherein the retrieved snapshot directory entry includes a generation-ID;
      determining if the generation-ID and the snapshot-ID are dissimilar;
      in response to determining the generation-ID and the snapshot-ID are dissimilar, retrieving a second snapshot tracking file directory entry from the distributed file system based on the value of the generation-ID, wherein the snapshot-ID is set to the value of the generation-ID;
      retrieving a directory entry for the file from the second snapshot tracking file directory based on the entry-ID and the snapshot-ID;
      performing the operation request on the retrieved directory entry for the file, wherein the performing of the operation request based on the second snapshot tracking file directory is transparent to the client;
      receiving an alias request that includes at least the snapshot-ID, and an alias-ID;
      retrieving the snapshot tracking file directory entry that corresponds to the snapshot-ID; and
      generating a new generation-ID for a new snapshot alias file directory entry that corresponds to the alias-ID and saving the new snapshot alias file directory entry in the distributed file system.

7. The network device of claim 6, further comprising, storing the second snapshot tracking file directory entry in a cache.

8. The network device of claim 6, wherein retrieving the second snapshot tracking file directory entry, further comprises, determining if the second snapshot tracking file directory entry is available in a cache before retrieving the second snapshot tracking file directory entry from the distributed file system.

9. The network device of claim 6, further comprising, associating the generation-ID of the directory entry to a writable file system.

10. The network device of claim 6, further comprising, generating at least one file handle that corresponds to the entry-ID and the snapshot-ID.

11. A system for enabling a network device to access files in a distributed file system, comprising:
  a server network device, including:
    a transceiver for communicating over the network;
    a memory for storing at least instructions;
    a processor device that is operative to execute instructions that enable actions, including:
      receiving an operation request a client device that includes at least an entry-ID for a file and a snapshot ID;
      determining if the generation-ID and the snapshot-ID are dissimilar;
      in response to determining the generation-ID and the snapshot-ID are dissimilar, retrieving a second snapshot tracking file directory entry from the distributed file system based on the value of the generation-ID, wherein the snapshot-ID is set to the value of the generation-ID;
      retrieving a directory entry for the file from the second snapshot tracking file directory based on the entry-ID and the snapshot-ID; and
      performing the operation request on the retrieved directory entry for the file, wherein the performing of the operation request based on the second snapshot tracking file directory is transparent to the client;
      receiving an alias request that includes at least the snapshot-ID, and an alias-ID;
      retrieving the snapshot tracking file directory entry that corresponds to the snapshot-ID; and
      generating a new generation-ID for a new snapshot alias file directory entry that corresponds to the alias-ID and saving the new snapshot alias file directory entry in the distributed file system; and
  the client device, including:
    a transceiver for communicating over the network;
    a memory for storing at least instructions;
    a processor device that is operative to execute instructions that enable actions, including:
      generating the operation request, wherein the operation request includes the entry-ID and the snapshot ID, wherein the entry-ID is determined from a file handle; and
      generating the alias request, wherein the alias request includes the snapshot-ID and the alias-ID.

12. The system of claim 11, further comprising, storing the second snapshot tracking file directory entry in a cache.

13. The system of claim 11, wherein retrieving the second snapshot tracking file directory entry, further comprises, determining if the second snapshot tracking file directory entry is available in a cache before retrieving the second snapshot tracking file directory entry from the distributed file system.

14. The system of claim 11, further comprising, associating the generation-ID of the directory entry to a writable file system.

15. The system of claim 11, further comprising, generating at least one file handle that corresponds to the entry-ID and the snapshot-ID.

16. A processor readable non-transitive storage media that includes instructions for enabling a network device to access files in a distributed file system, wherein the network device that executes at least a portion of the instructions enables actions, comprising:
  receiving an operation request from a client that includes at least an entry-ID for a file and a snapshot ID;
  retrieving a snapshot tracking file directory entry from the distributed file system based on the snapshot-ID, wherein the retrieved snapshot tracking file directory entry includes a generation-ID;
  determining if the generation-ID and the snapshot-ID are dissimilar;
  in response to determining the generation-ID and the snapshot-ID are dissimilar, retrieving a second snapshot tracking file directory entry from the distributed file system based on the value of the generation-ID, wherein the snapshot-ID is set to the value of the generation-ID;
  retrieving a directory entry for the file from the second snapshot tracking file directory based on the entry-ID and the snapshot-ID;
  performing the operation request on the retrieved directory entry for the file, wherein the performing of the operation request based on the second snapshot tracking file directory is transparent to the client;
  receiving an alias request that includes at least the snapshot-ID, and an alias-ID;
  retrieving the snapshot tracking file directory entry that corresponds to the snapshot-ID; and
  generating a new generation-ID for a new snapshot alias file directory entry that corresponds to the alias-ID and saving the new snapshot alias file directory entry in the distributed file system.

17. The media of claim 16, further comprising, storing the second snapshot tracking file directory entry in a cache.

18. The media of claim 16, wherein retrieving the second snapshot tracking file directory entry, further comprises, determining if the second snapshot tracking file directory entry is available in a cache before retrieving the second snapshot tracking file directory entry from the distributed file system.

19. The media of claim 16, further comprising, associating the generation-ID of the snapshot tracking file directory entry to a writable file system.

20. The media of claim 16, further comprising, generating at least one file handle that corresponds to the entry-ID and the snapshot-ID.

* * * * *